United States Patent [19]

Gigoux et al.

[11] 3,721,612

[45] March 20, 1973

[54] METHOD OF MAKING MAGNETIC CIRCUIT ELEMENTS

[75] Inventors: Claude R. Gigoux; Antide Putz, both of Paris, France

[73] Assignee: Thomson-CSF, Paris, France

[22] Filed: Nov. 7, 1969

[21] Appl. No.: 874,910

[30] Foreign Application Priority Data

Nov. 14, 1972 France..............................72173755

[52] U.S. Cl. ..........................204/15, 29/604, 204/9, 340/174 QB

[51] Int. Cl. ..........C23b 5/48, C23b 7/02, H01f 3/00

[58] Field of Search ..........204/15, 16, 23, 9; 29/604, 29/625; 174/68.5; 340/174 QB

[56] References Cited

UNITED STATES PATENTS

| | | | |
|---|---|---|---|
| 3,407,492 | 10/1968 | Davis | 29/604 |
| 3,471,836 | 10/1969 | Smith et al. | 340/174 |
| 3,492,665 | 1/1970 | Stoehr | 29/604 |
| 3,566,461 | 3/1971 | Carbonel | 174/68.5 |
| 3,583,066 | 6/1971 | Carbonel | 29/625 |
| 3,611,558 | 10/1971 | Carbonel | 29/604 |

*Primary Examiner*—John H. Mack
*Assistant Examiner*—Thomas Tufariello
*Attorney*—Cushman, Darby and Cushman

[57] ABSTRACT

The invention has for object a method of manufacturing a magnetic circuit element, consisting of an hollow elongated cylinder.

Alternate layers of copper and gold are deposited by electrolysis over a metal substrate thus forming a stacked body. This body is separated from the substrate. Ferromagnetic material is deposited over the stacked body. The cylinder is then formed. The copper inside the cylinder is then removed and replaced by insulating material.

9 Claims, 43 Drawing Figures

METHOD OF MAKING MAGNETIC CIRCUIT ELEMENTS

The present invention relates to magnetic cores.

In logic circuits, the problem is encountered of recording in a row (or a column) of a magnetic memory made up of a core matrix, a "word" of $n$ bits, n being the number of elements in the row and each bit corresponding to the 0 or 1 state of the cores of the column or row.

To this end, around the cores of each line, write-in windings are arranged. These windings, which form the "word line," are connected in series with a winding which is itself formed around a core referred to as the control core. This winding plays the part of the secondary of a transformer, the primary winding of which, also wound on the control core, is connected to a pulse source. The problem is to obtain in the secondary, in response to said control pulse which causes the control core to change state, a word line current which is sufficiently high to cause, if necessary, all the cores in the row to change state.

It is well known, to achieve this effect, to employ control cores which are cut out of a very thin sheet of magnetic material and have a large external contour compared with the central opening. This kind of arrangement produces a relative increase in the magnetizing current if the same switching time is to be maintained, or an increase in the length of the conductors and this increases the losses in same.

It is an object of this invention to provide a method of manufacturing magnetic control elements which avoid such drawbacks.

According to the invention, there is provided a method of manufacturing a magnetic circuit element consisting of an elongated hollow cylinder, made of a ferromagnetic material, and a plurality of conductors extending inside said cylinder, parallel to the axis thereof, said method comprising the following steps:

a. depositing by electrolysis through photoresist masks upon a metal substrate, alternate parallel layers of a first metal having a high resistance to chemical agents and of a second metal easily attackable by said chemical agents so as to form a cylindrical body;

b. depositing by electrolysis upon said body, a layer of ferromagnetic material; and c. removing said second metal by chemical attack and substituting, for at least a portion thereof, an insulating material.

For a better understanding of the invention and to show how the same may be carried into effect reference will be made to the drawings accompanying the ensuing description and in which.

Figures 1, 2, 3, 4:
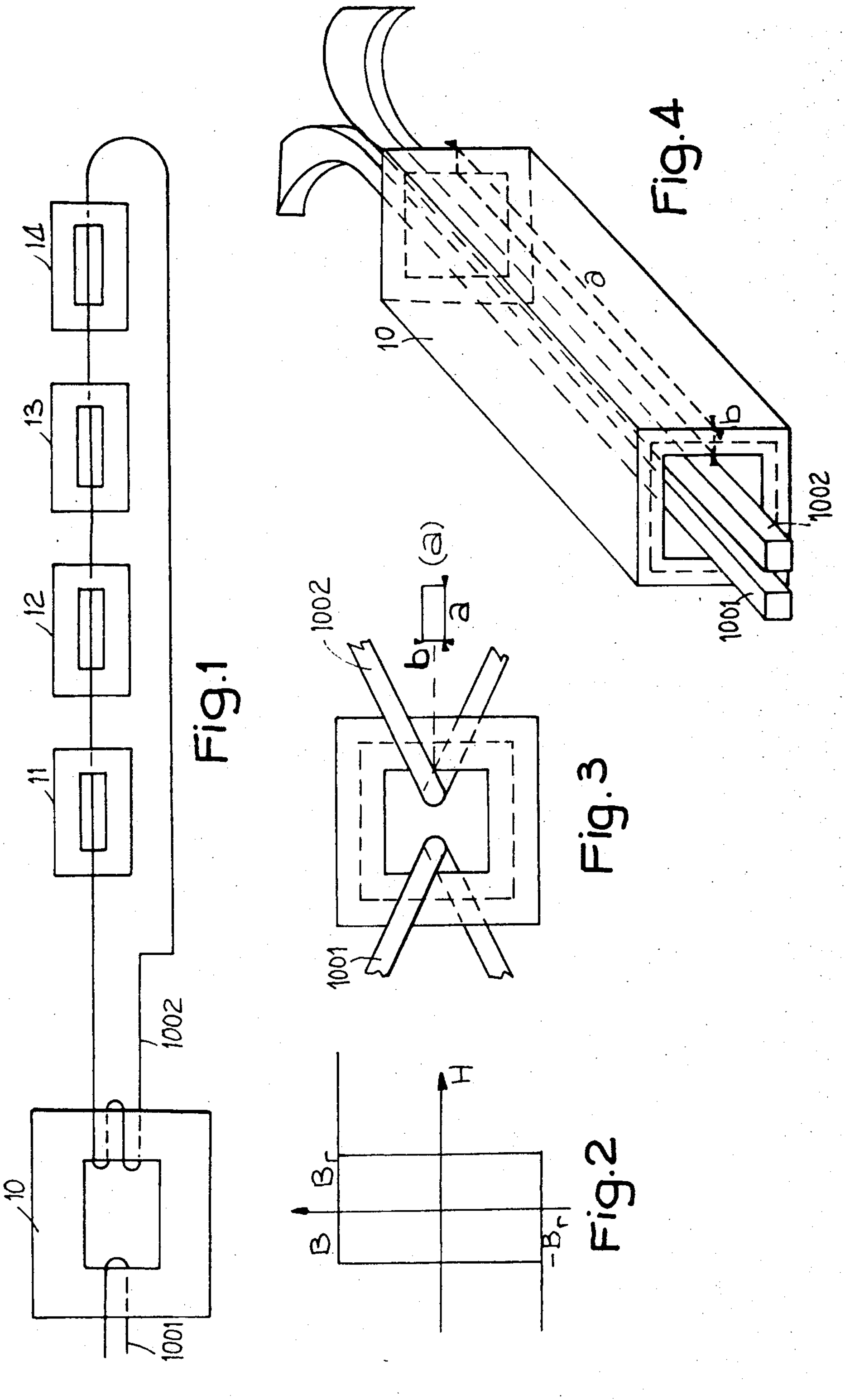
FIGS. 1, 2 and 3 show how an element, with the manufacture of which the invention is concerned, operates, and what are its advantages.
FIG. 4 is a perspective view of the same element.

In FIG. 1, a control core 10 can be seen, as well as the cores 11, 12, 13, 14 etc., of a row of a matrix-type magnetic memory.

A control winding 1001, connected to a pulse generator (not shown), has one or more primary turns wound around the core 10.

A secondary write-in winding 1002 is wound around the said same core. This winding or "word line" makes one turn around each core 11 to 14. This circuit is well known.

Let I be the amplitude of the control pulse supplied by the generator. The core 10 is made of a magnetic material having a rectangular hysteresis loop $B = f(H)$ (FIG. 2), and its remanence induction is $B_r$. The pulses are assumed to have an amplitude and a duration such that under its action, the magnetization of the core 10 changes state and switches from $B_r$ to $-B_r$, or vice versa. Let $n$ be the number of cores in the matrix.

During a time $dt$, the $m$ turns will experience a flux variation, and across the terminals of the secondary 1002, an e.m.f. $e = m\,(d\Phi/dt)$ will appear.

The winding 1002 passes a current i and each of the cores, in changing state, will produce a back-e.m.f. $d\rho/dt$, and if R is the resistance of the wire 1002, $m\,(d\Phi/dt) = Ri + n\,(d\rho/dt)$, where $m\,d\Phi = Ridt + n\,d\rho$ A small variation $d\Phi$ in the flux in the control core will produce $n$ variations of flux in the memory cores and a "flux loss" Ridt in the winding 1002.

The flux variation $m\,\Delta\Phi$ due to the total change of state, should be sufficient, taking into account the losses, to ensure that the $n$ cores may change state. The variation $\Delta\Phi$ due to the switching from the Br state to the $-Br$ state, is given by the relationship $\Delta\Phi = 2\,Br\,S$, wherein S is the area of the cross-section of the magnetic circuit, illustrated in FIG. 3, considered in a plane perpendicular to the plane of FIG. 3.

It goes without saying that, in order to increase $\Delta\Phi$ for a given material, ($Br$ being a constant), it is necessary to increase the area illustrated in FIG. 3 ($a$). This area being equal to $a{\cdot}b$, where a is the width of the leg of the magnetic circuit and $b$ the thickness of the sheet (the latter generally being determined right from the start) it is necessary to increase a and therefore to increase the external circumference of the core and consequently the length of the mean flux path thereof. The result is that for the same switching time, the control current has to be increased, or, for the same current, the switching time is increased.

The core shown in FIG. 4, overcomes this drawback.

This core takes the form of a hollow cylinder whose longitudinal dimensions are large in comparison to its transverse dimensions, i.e. its right section and thickness; its length is in the order of 1 mm to some few mm, and its other dimensions are in the order of some tens to some hundreds of microns.

Conductors 1001 and 1002 extend along the axis of the cylinder.

In this element, the magnetic lines of force are located in a plane determining a right section. With a given thickness b of the magnetic material, in order to increase the area S and thus the total flux variation $\Delta\Phi$, the only resort is to increase the length a of the core (FIG. 4). This does not increase the length of the mean magnetic path which is shorter than in the case of the core of FIG. 3. This means that smaller control currents can be used than in the case of this latter figure.

This is merely an example, since it is possible to employ an identical structure in order to create memory elements containing one or several holes, magnetic logic elements and so on.

The following figures will illustrate how a cylinder of the aforedescribed kind can be produced as an integrated circuit element by the method of the invention.

Figure 5:
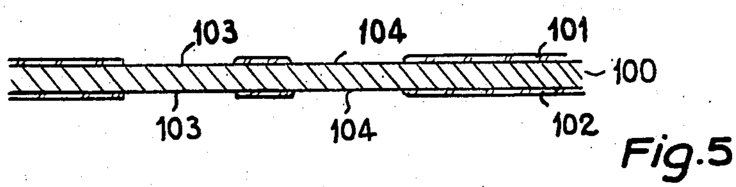
FIGS. 5 to 24 illustrate certain steps of a first method of manufacture according to the invention.
Figure 6:
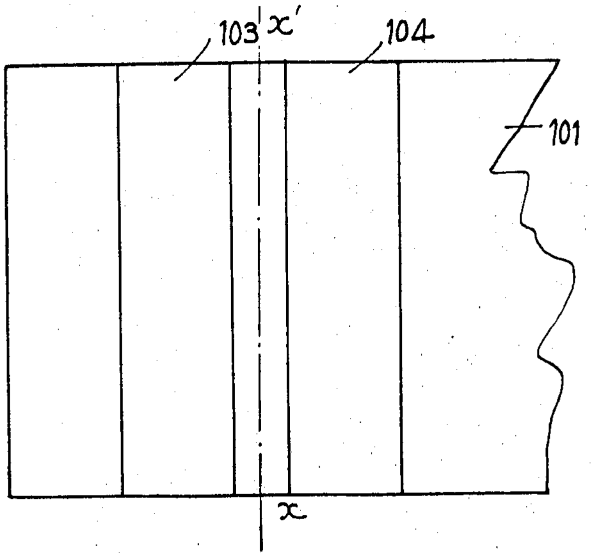

A copper plate 100, illustrated in transverse section in FIG. 5 and seen in plan in FIG. 6, is covered on both faces by layers of photosensitive resin 101 and 102.

The arrangement is exposed through a suitable photographic mask, so that after developping, the copper may be bared over the areas 103 and 104 at both sides of the plate. These two areas are rectangular strips extending along either side of the axis $x'x$ of the plate.

Figure 7:
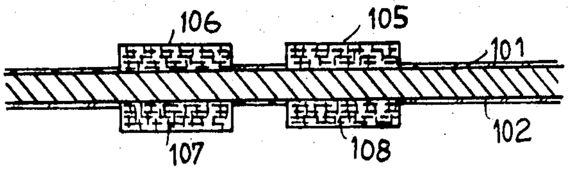

By electrolysis (FIG. 7) a metal which is a good electrical conductor and has a higher resistance to chemical attack than copper, for example gold or silver, is deposited upon the areas 103 and 104, the resin mask 101–102 preventing any deposition of this metal on the rest of the plate. Conductive strips 105 to 108 are thus produced, as shown in FIG. 7.

Figure 8:
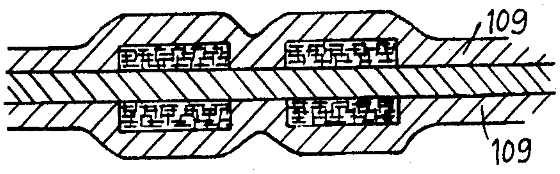

The photosensitive resin layer is then removed ; the plate is placed in an electrolytic bath containing a copper salt and a copper layer 109 is thus produced over the whole of the assembly as shown in FIG. 8.

A layer of photosensitive resin in then applied to the arrangement. The same process which has just been described is then repeated several consecutive times and as a result there are formed several conductive strips of gold or silver, 205 to 208, superimposed upon each other and alternating with copper layers 209 which will be subsequently eliminated.

It is obviously necessary to ensure that there is electrical contact between conductive strips located in two superimposed layers (that is to say which have been deposited in consecutive operations). Actually, each of these layers represents a turn of a conductor, and on occasion it is necessary to provide contact between turns. It will be shown on the basis of FIGS. 10 to 13, how this operation is carried out in accordance with the invention, the operation taking place in respect of each layer of the block illustrated in FIG. 9 and thus during the formation thereof.

Figure 10:
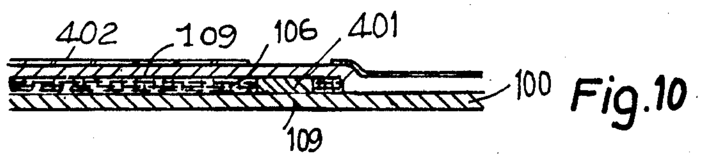

In FIG. 10, the copper plate 100 is illustrated in longitudinal section at the moment at which the conductive strip 106 has been deposited in the aforedescribed manner.

Using techniques of photogravure and with the help of a photosensitive resin, a hole 401 is formed at a suitable location in the conductive strip 106. This hole has been filled with copper at the time of deposition of the copper layer 109.

Figure 11:
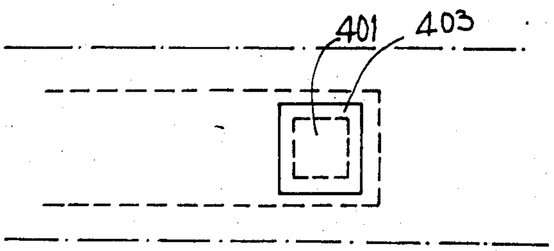

The assembly, illustrated in plan in FIG. 11, is then covered, in the manner afore described, with a layer 402 of photosensitive resin ; after exposure through an appropriate mask, followed by developing, the resin is removed from an area 403 which surrounds the hole 401.

Figure 12:
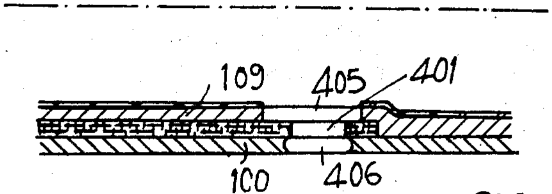

Using chemical attack, for example by means of ferric chloride or ammonium persulphate, the copper of the layer 109, bared by means of the resin at this location, is etched away whilst the copper filling the hole 401 is eliminated ; the gold is not affected. A hole 405 is formed in the layer 109 and a hole 406 in the layer 100 (FIG. 12). A passage across the assembly is thus produced.

Figure 13:
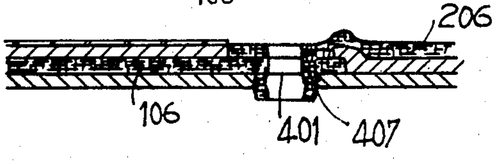

The gold 206 deposited upon the copper layer 109 and on the walls of the hole 405 and the gold exposed by holes 406 and 401, form an eyelet 407 extending through the whole of the structure as shown in FIG. 13.

Thereafter, the formation of other layers is carried out in the manner hereinbefore described.

With the help of the ensuing figures, it will be shown how the core of the element shown in FIG. 4, is produced.

Figures 14, 15, 16, 17:
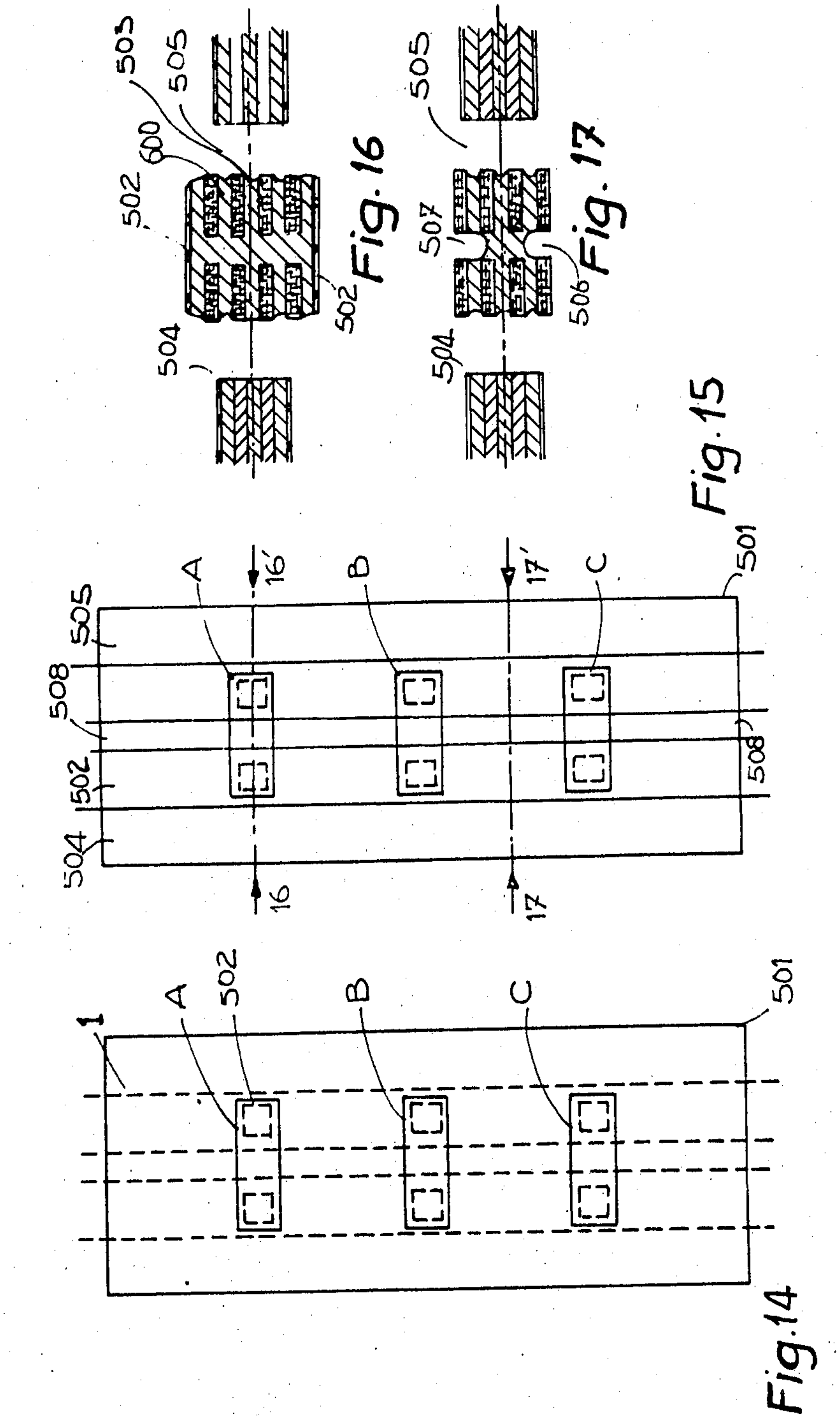

FIG. 14 is a plan view of the gold strips embedded in copper, the assembly having been covered with a photosensitive layer 501.

Figure 9:
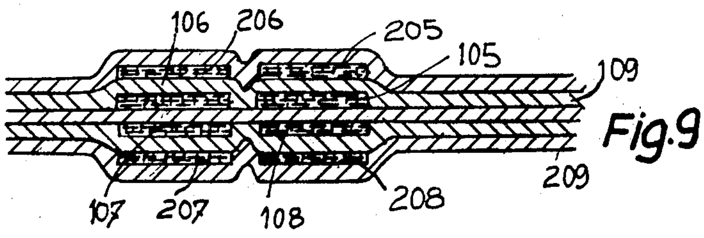

A mask is then formed over that rectangular area of the assembly of FIG. 9 where the cylinder is to be formed. This mask has such windows that after exposure the photoresist is removed everywhere except for the areas A, B and C. The bared copper is then removed so that there remains copper only at A, B and C and at ends of the plate where core has been taken not to remove copper.

FIG. 15 illustrates the same plate after elimination of copper at the areas not protected by the photosensitive resin. FIG. 16 and FIG. 17 provide transverse sectional views through the plate of FIG. 15, in the planes 16 – 16' and 17 – 17'.

In FIG. 16 the assembly of conductors 503, covered on both faces by a layer of photosensitive resin 502, can be seen, this corresponding to the area A, B or C of FIG. 14. The set of conductors is separated from the remainder of the copper plate by windows 504 and 505.

FIG. 17 illustrates the results produced on a set of conductors by chemical attack on the copper, at a location not protected by the photosensitive resin. Pits 506 and 507 have been formed in the copper in the central region not protected by the conductors, the copper not having been entirely eliminated. The set of conductors is maintained in position at the two extremities 508 (FIG. 15) in the copper plate as mentioned hereinabove.

Figure 18:
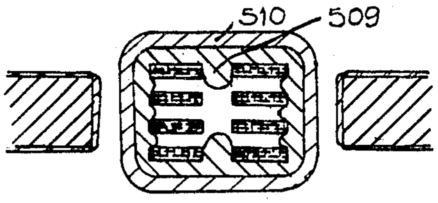
Figure 19:
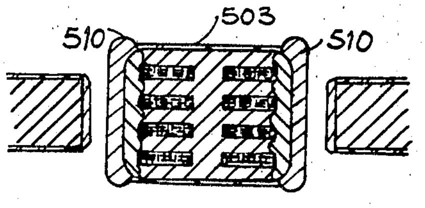

FIGS. 18 and 19 illustrate the parts of the assembly, shown respectively in FIGS. 17 and 16, after the deposition of a layer of copper 509 at the locations not covered by the photosensitive resin, and after the deposition on the copper layer 509 of a layer of magnetic metal 510.

The result is a cylinder 510 (ultimately destined to be hollowed out) made of magnetic material. It is viewed in plan in FIG. 20, said cylinder having windows A, B and C, covered with photosensitive resin.

Figure 21:
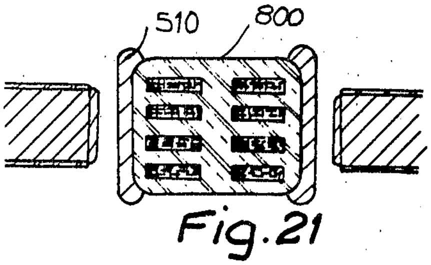

In FIG. 21, the strips of photosensitive resin at A and C have been exposed and dissolved. Then, using for example ammonium persulphate ammoniacal, the copper inside the cylinder 510 is dissolved in a zone close to the windows A and C.

The copper which is etched away in this fashion, is replaced by an insulating material 800; for example the same photosensitive resin which has been used so far, is introduced into the interior of the cylinder 510 through the windows A and C (FIG. 21). This resin serves to keep the conductors and the cylinder 510 properly insulated from one another.

During this local etching of the copper, pillars of insulating material such as photosensitive resin are substituted for copper beyond the ends of the cylinder.

Figures 20, 22, 23, 24:
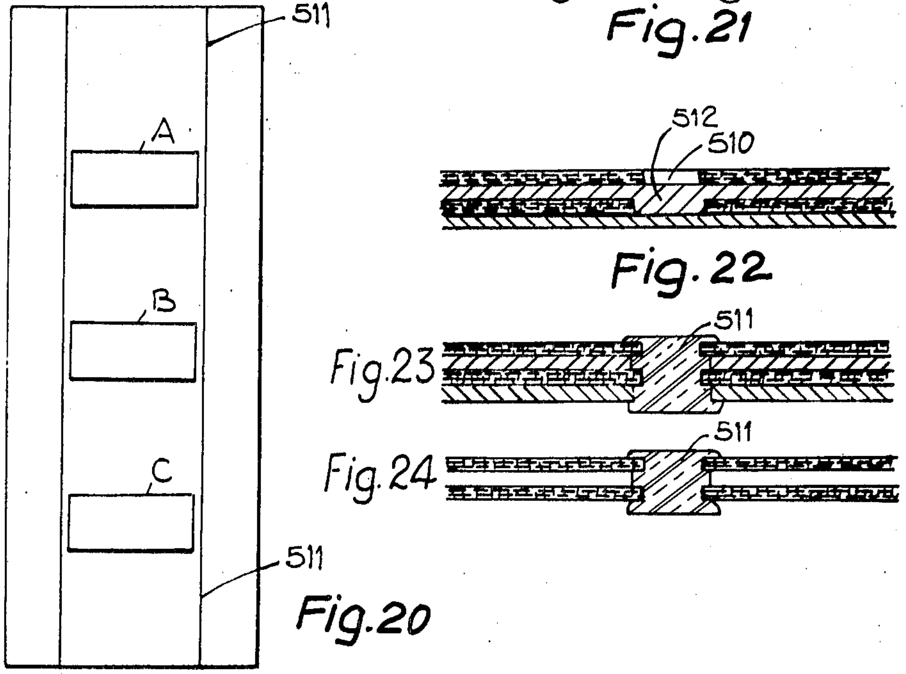

FIGS. 22, 23 and 24 illustrate the formation of such a pillar of photosensitive resin externally of the cylinder 510. To this end, holes 512 are formed in the conductors by some known method, as shown in the longitudinal section of FIG. 22. These holes are filled with photosensitive resin (FIG. 23) which forms the pillars 511 at the location of the holes.

The ends of the conductors are then glued to an insulating plate. At this stage, photosensitive resin exists, within the element, only in the slots A and C and in the aforementioned pillars.

The resin 502 covering the window B is then removed.

Then, through window B and the two ends of the cylinder, the copper left in the core and outside it, is etched away. The conductors are supported by the pillars 511 and the resin at the windows A and C. When no more copper is left, it is replaced by the insulating material which is introduced between the conductors and the interior of the core. At this stage, the conductors are insulated from the core and from one another. FIG. 24 illustrates the assembly in the condition where, in the preceding operation, the whole of the residual copper has been eliminated by etching.

Several modifications of the method of manufacturing the magnetic circuit element in accordance with the invention will be described hereinafter.

First modification :

At the start, there is deposited upon the two faces of the copper substrate, a layer of metal which is not attacked by ammonium persulphate, for example nickel. The conductors and the photosensitive resin pillars are then produced in the manner hereinbefore described.

After the removal of copper of the layers 109, 209, the basic substrate is left behind, the copper of layer 1 having been protected against chemical attack by the two nickel layers. The pillars of photosensitive resin rest on the substrate.

Figure 25:
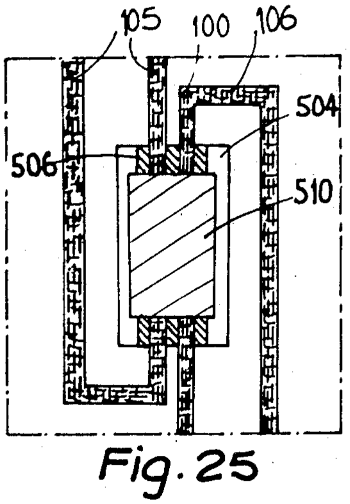
FIGS. 25 and 26 illustrate certain steps of a modification of the method of manufacture according to the invention.

FIG. 25 provides a plan view of the device at this stage of manufacture. In this figure, the cylinder 510 and the conductors 105 and 106 (deposited on the substrate and extending within the cylinder parallel to its axis), can be seen.

Figure 26:
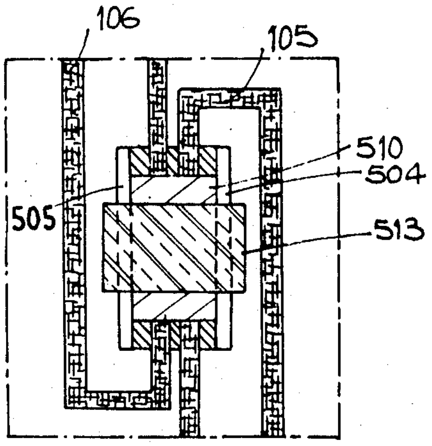

Subsequently, a photosensitive resin is deposited upon the assembly using a suitable mask. After exposing and developing, the resin remains behind only at the location of the pillars. Also, a block 513 of resin is left which surrounds the core and extends beyond the windows 504 and 505 (FIG. 26). This resin block insures the rigidity of the whole when the copper of layers 109, 209 is removed as described herein above. The arrangement is then subjected to photogravure, which eliminates the remaining copper as in the preceding method.

Inside the cylinder, as in the previous method, the copper is replaced by photosensitive resin. All the nickel and the remaining copper is removed, and all that is left is the cylinder and the conductors, the latter being insulated from the cylinder and from one another.

Figure 27:
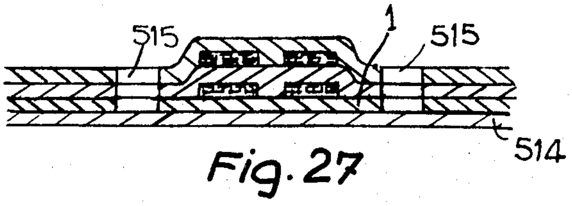
FIGS. 27 to 29 illustrate steps of a further modification of the method of manufacture according to the invention.
Figure 28:
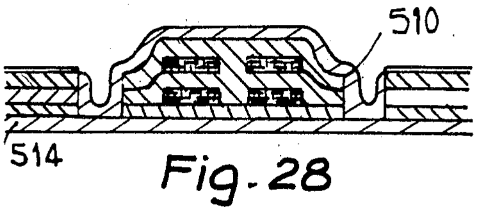

Second modification :

In this embodiment, the substrate 514 is made of the same magnetic material of which the cylinder will be made (FIG. 27). The conductors are produced by the alternate deposition of gold and copper layers as in the first method. Then, baring the material 514, two grooves 515 are produced in the copper to delimit the eventual cylinder. In FIG. 28, the magnetic material forming the cylinder 510 is deposited on the copper and in the grooves 515 on the substrate 514.

Figure 29:
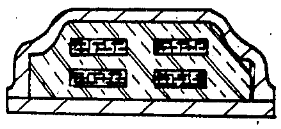

The copper inside and outside the core is removed as in the first method. At windows A and C, the pillars of photosensitive resin are formed in the same way. Using photogravure techniques, the unwanted parts of the substrate 514 are removed leaving only the core and the conductors, and the result is the assembly illustrated in FIG. 29.

Third modification :

This method differs from the foregoing one in that copper is replaced by insulating material prior to the formation of the magnetic cylinder.

Figure 30:
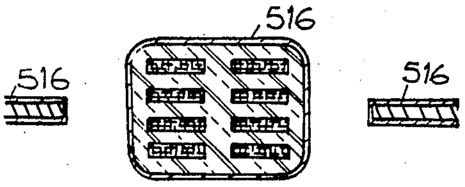
FIGS. 30 to 31, 32 to 35, 36 to 39, 40 to 43 illustrate the steps of still further modifications of the method of manufacture according to the invention.

In FIG. 30, this operation has been carried out and, by vaporization under vacuum, a thin film 516 of magnetic material has been deposited around the assembly. It also covers the copper plate. Then photosensitive resin 1000 is deposited on the two faces of the plate and, using electrolysis, the thickness of the layer of magnetic metal is increased until it has a suitable value. The ensuing operations are then the same as in the process first described.

Fourth modification :

This method is distinguished from the first by the fact that the conductors are maintained in the magnetic cylinder by strips of photosensitive resin and not pillars.

Figure 32:
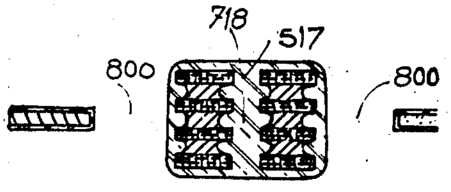
Figure 31:
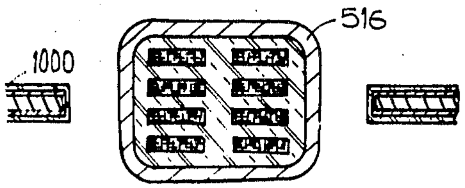
Figure 33:
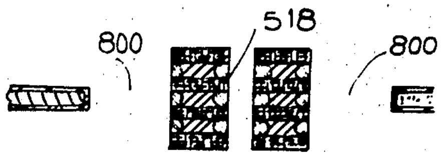
Figures 34, 35:
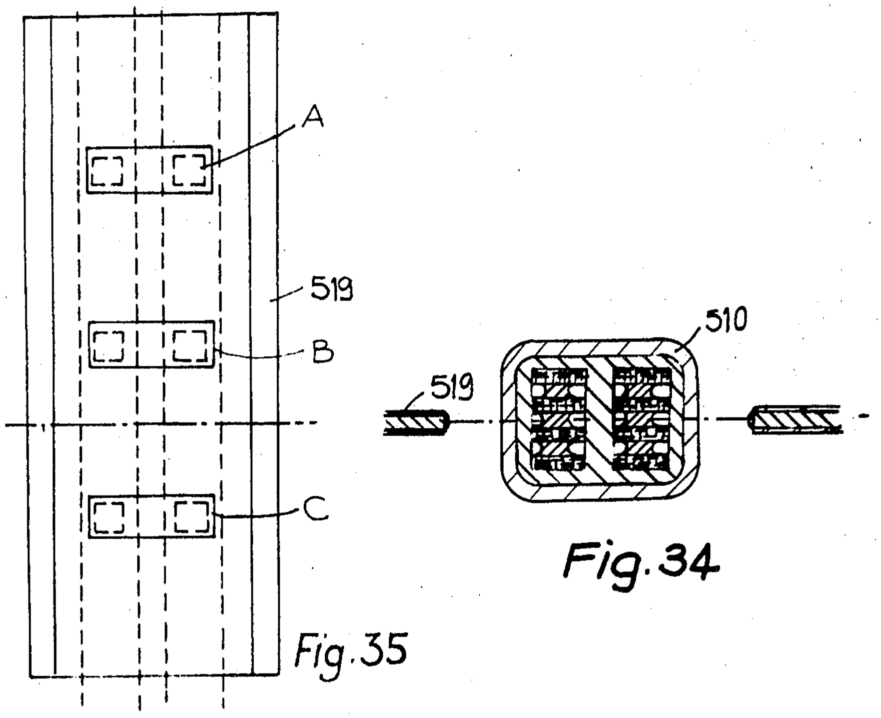

FIG. 32 illustrates the arrangement after the operations which have led to the structure shown in FIG. 17 (first process). The copper is then removed entirely from the zones 506 and 507. A central window 518 is thus formed but the copper is left between the conductors. The assembly is then immersed in photosensitive resin 517. After expositing and developing, the strips 518 of resin remain between the conductors from one end of the cylinder to the other and keep the same in position as shown in FIG. 33. Copper is then deposided by electrolysis between and around the conductors and a magnetic core cylinder 510 is formed about the copper as shown in transverse section in FIG. 34 and in plane view in FIG. 35. The windows A, B and C are formed as in the first method.

The sequence of operations is then the same as in the first method.

Fifth modification :

The operation of applying the conductors and the copper layers, are the same as in the main method.

Figure 36:
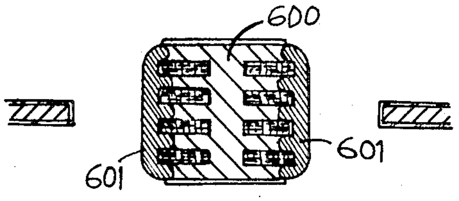
Figure 37:
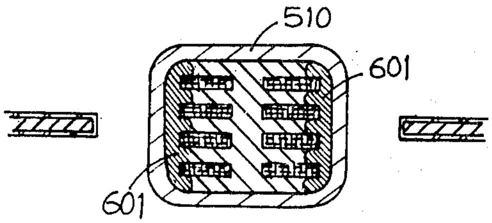

A window is formed at either side of the conductors 10, as in FIG. 16. Then (FIG. 36) electrolysis is used to deposit upon the arrangement 600 formed by the conductors layers and copper layers, a metal 601 which is susceptible to chemical attack whilst the copper, the metal of the conductors and the magnetic material are not. Such a material is for example tin. Therefore, on the lateral portions of the cylinder 600, photosensitive resin layers are deposited to prevent any deposition on the terminal faces and on the windows A, B and C.

The photosensitive layer is removed from the cylindrical portion and then, using electrolysis, magnetic material is deposited to form the cylinder 510.

Figure 38:
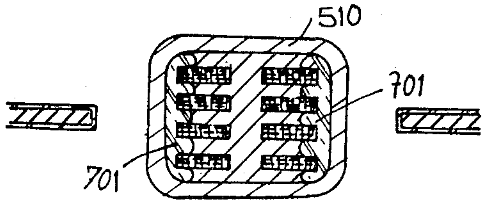

FIG. 38 shows the removal of the layer 601 by chemical etching using a strongly basic product, followed by replacement with a photosensitive resin 701. This layer 701 ensures that the conductors are maintained in position when the copper is removed.

Figure 39:
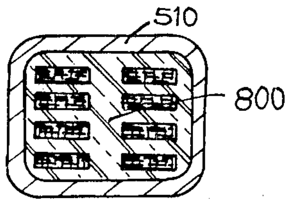

The removal of the copper is carried out in the same way as in the main method. The arrangement of FIG. 39 results.

Sixth modification :

This modification differs from the first embodiment in that no windows A, B and C and no supporting pillar formed.

Figure 40:
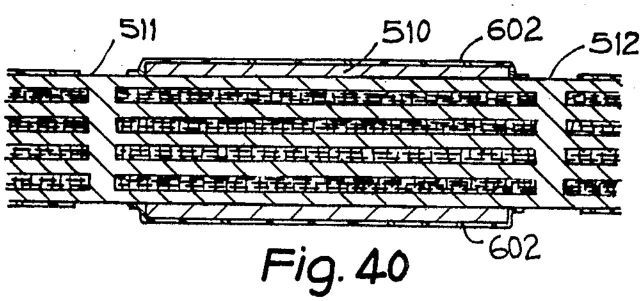
Figure 41:
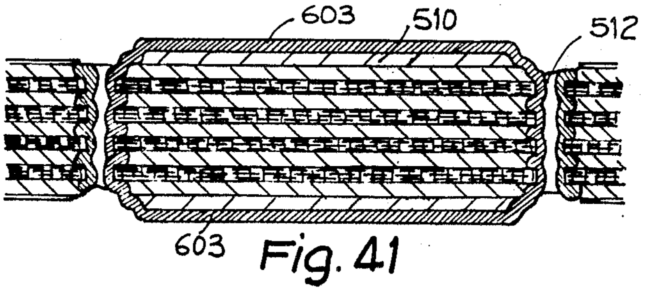

FIG. 40 shows in axial section, the magnetic core 510 which was formed in the same manner as according to the first method but has no windows. A layer 602 of photosensitive resin is then deposited on the core and on the plate 100. The copper is then bared by means of a mask where holes 511 and 512 will be formed on both sides of the core cylinder 510. 511 and 512 are then formed by etching and an electrolytic tin deposit is placed on the cylinder 510 and the walls of the holes 511 and 512, thus forming a tin envelope 603.

Figure 42:
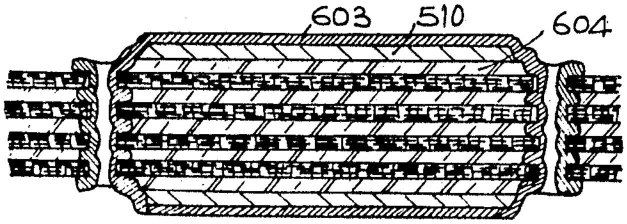
Figure 43:
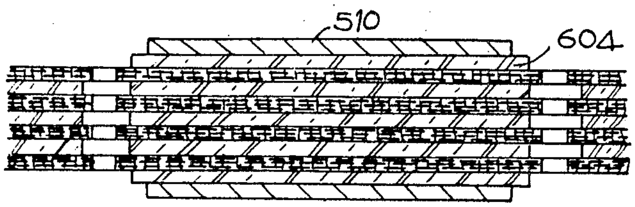

Then, as shown in FIG. 42 by means of windows provided, to this effect, at the ends of the envelope 603, the copper is eliminated and replaced by an insulating material, for example, the photoresist.

The tin envelope is then removed in any suitable manner.

Of course, the invention is not limited to the embodiments described and shown which given solely by way of example.

What is claimed, is :

1. A method of manufacturing a magnetic circuit element comprising an elongated hollow cylinder of a ferromagnetic material and a plurality of conductors extending through said cylinder, parallel to the axis thereof, said method comprising the following steps :

a. depositing by electrolysis through photoresist masks upon a metal substrate, alternate parallel layers of a first metal having a high resistance to chemical agents and of a second metal easily attackable by said chemical agents thus forming a stacked body upon said substrate and separating said stacked body from said substrate at least longitudinally, thus forming a cylindrical body.

b. depositing by electrolysis upon said body an envelope of ferromagnetic material ; and c. removing said second metal from within said envelope by chemical attack and substituting therefore an insulating material.

2. A method as claimed in claim 1, wherein the step of depositing said second metal layers, comprises the step of forming holes in said first metal by means of suitable masks, said holes being filled by said second metal during the deposition thereof, etching said second metal layer through said holes and forming in said holes eyelets of said first metal for interconnecting two adjacent first metal layers during the deposition of a further first metal layer .

3. A method as claimed in claim 2, wherein the step of removing from said body said second metal precedes the step of depositing said ferromagnetic material, and comprises prior to the depositing of said ferromagnetic material, the further step of depositing over said body a thin layer of said ferromagnetic material.

4. A method as claimed in claim 2, comprising the step of covering partially said ferromagnetic envelope by another metal which is not attackable by said etching agents, prior to etching said second metal and removing said other metal after replacing said second metal by an insulating material.

5. A method as claimed in claim 2, further comprising the step of covering partially said stacked body by a further metal which is not attackable by said etching agent, and removing said further metal after replacing said second metal by an insulating material.

6. A method as claimed in claim 1, wherein the step of separating said stacked body from said substrate comprises the steps of forming a photoresist mask about said stacked body, etching away said second metal through said mask, depositing on said stacked a further layer of said second metal, and depositing said ferromagnetic material on said further layer.

7. A method as claimed in claim 6, wherein the step of forming a mask upon said stacked body, comprises forming masks on predetermined portions of upper and lower walls of said stacked body, whereby windows are formed in said ferromagnetic envelope upon depositing said ferromagnetic material for removing said second metal by etching through said windows.

8. A method as claimed in claim 1, wherein said substrate is of said ferromagnetic material.

9. A method as claimed in claim 8, wherein the step of separating said stacked body from said substrate comprises forming grooves in said substrate on each side of said body and etching said ferromagnetic material through said grooves.

* * * * *